Aug. 17, 1965

C. E. MERCIER 3,201,551

AIR-MAGNETIC TYPE CIRCUIT INTERRUPTER HAVING PLANAR BLOWOUT
COILS AND PRIMARY CONDUCTOR MOUNTED PUFFER MEANS

Filed March 23, 1962

Carl E. Mercier,
Inventor.
Koenig, Pope, Senniger and Power
Attorneys.

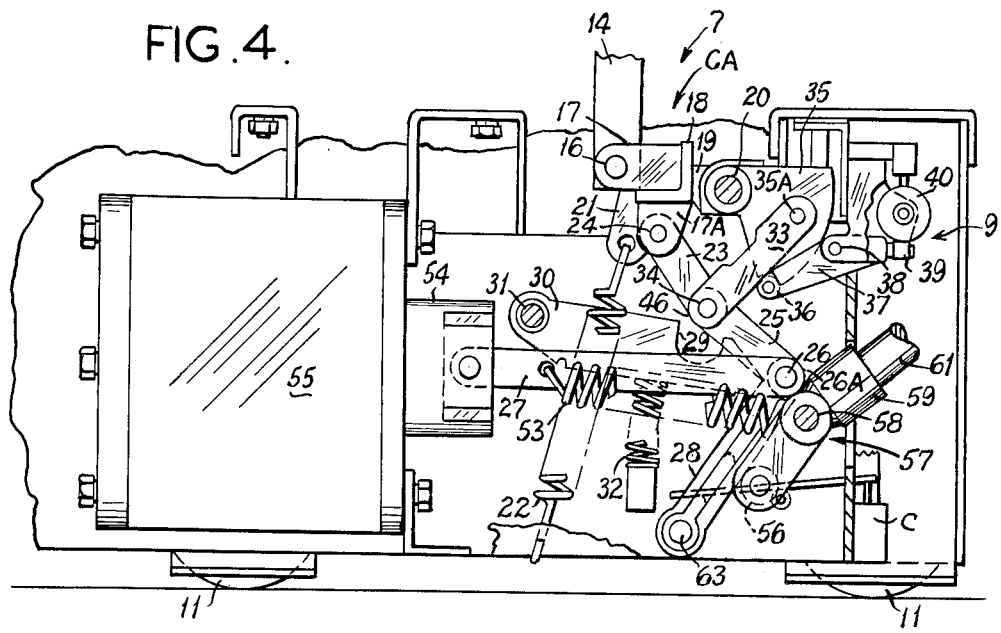

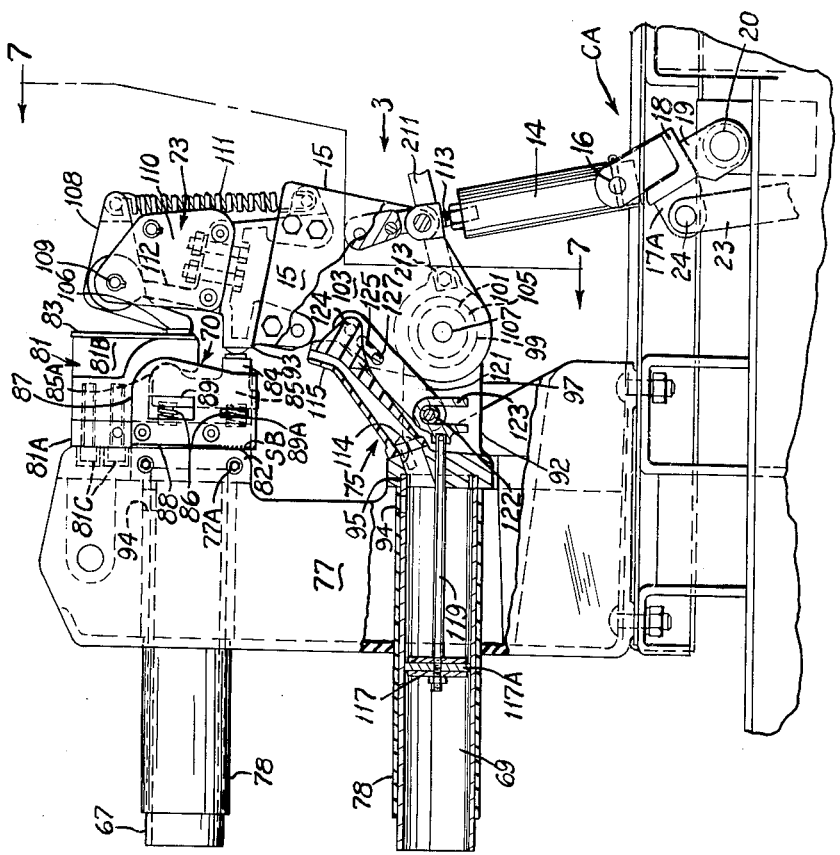

Aug. 17, 1965     C. E. MERCIER     3,201,551
AIR-MAGNETIC TYPE CIRCUIT INTERRUPTER HAVING PLANAR BLOWOUT
COILS AND PRIMARY CONDUCTOR MOUNTED PUFFER MEANS
Filed March 23, 1962     11 Sheets-Sheet 6

FIG. 12.
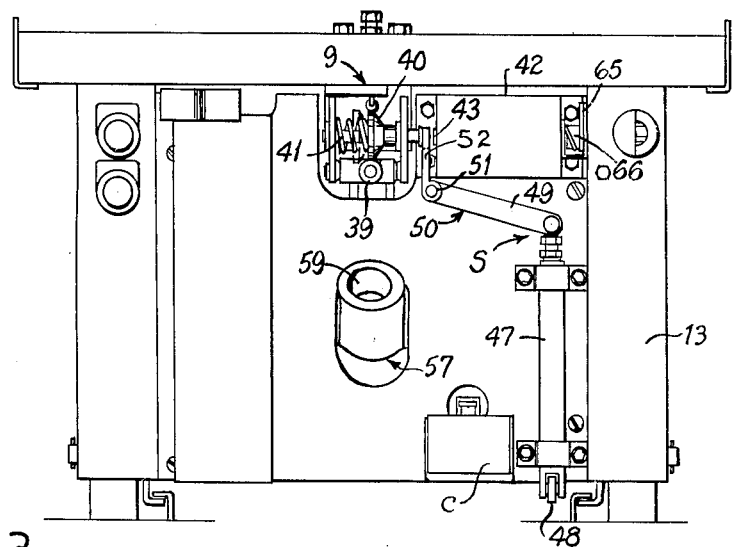
FIG. 13.
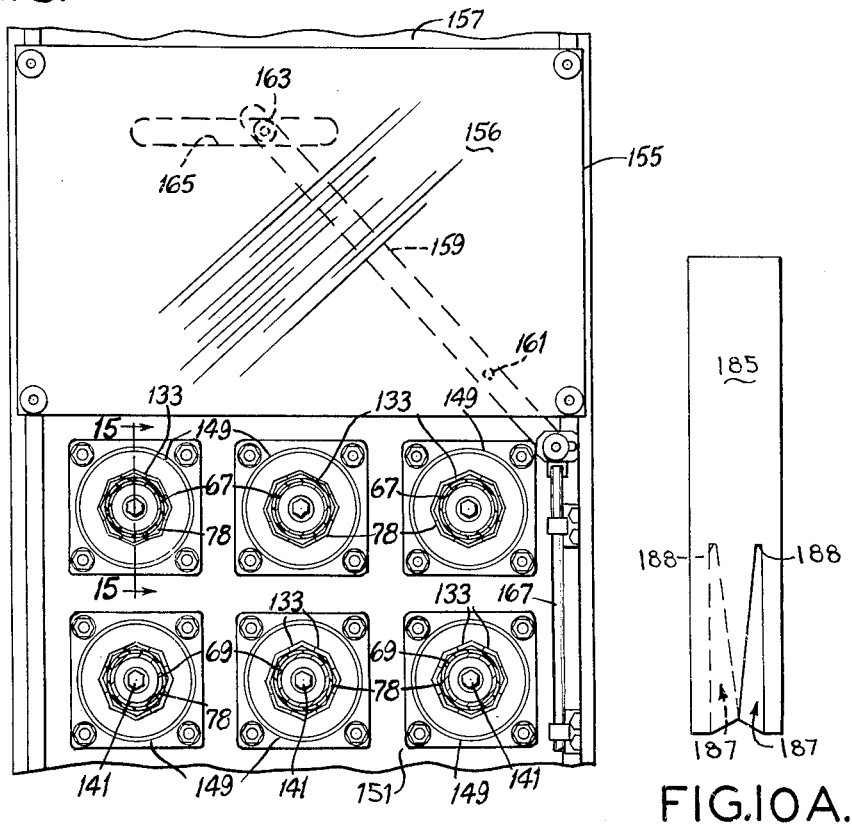
FIG. 10A.

Aug. 17, 1965 C. E. MERCIER 3,201,551
AIR-MAGNETIC TYPE CIRCUIT INTERRUPTER HAVING PLANAR BLOWOUT
COILS AND PRIMARY CONDUCTOR MOUNTED PUFFER MEANS
Filed March 23, 1962 11 Sheets-Sheet 8

Aug. 17, 1965 C. E. MERCIER 3,201,551
AIR-MAGNETIC TYPE CIRCUIT INTERRUPTER HAVING PLANAR BLOWOUT
COILS AND PRIMARY CONDUCTOR MOUNTED PUFFER MEANS
Filed March 23, 1962 11 Sheets-Sheet 10

3,201,551
AIR-MAGNETIC TYPE CIRCUIT INTERRUPTER HAVING PLANAR BLOWOUT COILS AND PRIMARY CONDUCTOR MOUNTED PUFFER MEANS
Carl E. Mercier, Bellefontaine Neighbors, Mo., assignor to Moloney Electric Company, St. Louis, Mo., a corporation of Delaware
Filed Mar. 23, 1962, Ser. No. 181,946
17 Claims. (Cl. 200—147)

This invention relates to circuit interrupters, and more particularly to improved circuit interrupters of the air-magnetic type.

Among the several objects of this invention may be noted the provision of an air-magnetic circuit interrupter in which electromagnetic forces derived from the energy of the arc produced by interruption are utilized in such a manner that the arc is quickly forced away from the switch contacts into the arc chute and extinguished, regardless of the magnitude of the fault current causing the interruption; the provision of an interrupter of the class described which extinguishes the arc in substantially the same time or number of cycles during both low and high overload or fault current interruptions; the provision of an air-magnetic type of circuit interrupter in which high blow-on forces are obtained on both the main and arcing contacts of the switch assembly, thereby resulting in solid contact pressure with an attendant decrease in contact resistance and increase in contact longevity; the provision of such an interrupter having a novel air blast or "puffer" structure which is compact and permits reducing the mass and inertia of various movable parts of the interrupter; the provision of a circuit interrupter of the class described having an improved cooling arrangement for the main current-carrying components; the provision of such an air-magnetic circuit interrupter having a novel tripping mechanism for the operating assembly; and the provision of a circuit interrupter of the air-magnetic type which is compact in design, reliable in operation and efficient in performance. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated:

FIG. 4 is an enlarged fragmentary view of the operating mechanism just before the contacts are to be reclosed;

FIG. 5 is a front elevation of the operating mechanism taken from the right-hand side of FIG. 4;

FIG. 6 is an enlarged view of a switching assembly of this interrupter including the primary conductors, contacts and puffer mechanism of this invention;

FIG. 7 is a view taken on line 7—7 of FIG. 6;

FIG. 10A is an elevation of two adjacent arc chute barrier plates;

FIG. 12 is an enlarged partial front elevation of the interrupter of FIG. 1 illustrating a tripping mechanism of this invention;

FIG. 13 is a vertical section taken on line 13—13 of FIG. 1;

Figure 23:
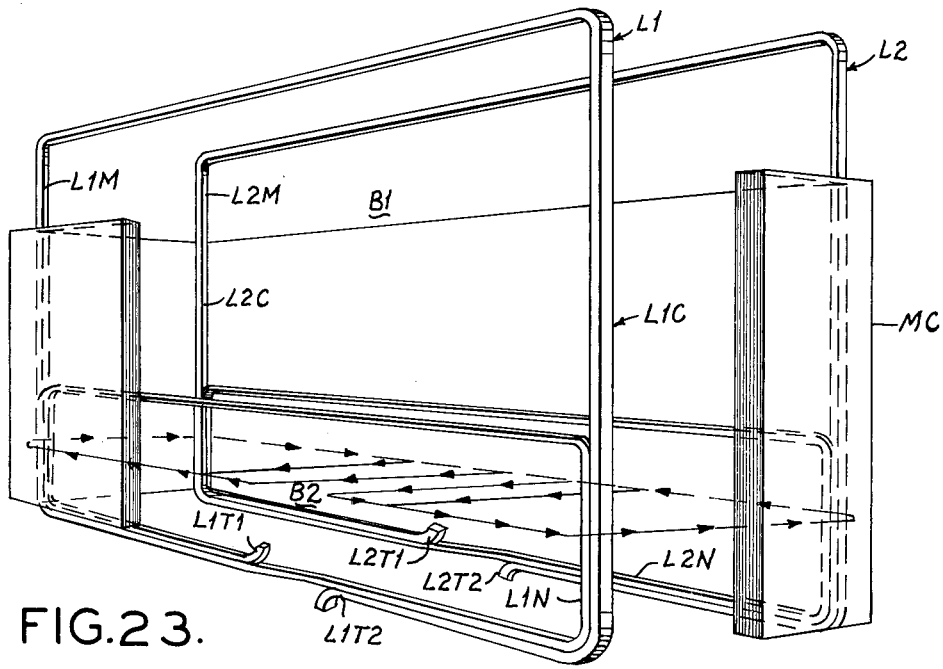
Figure 24:
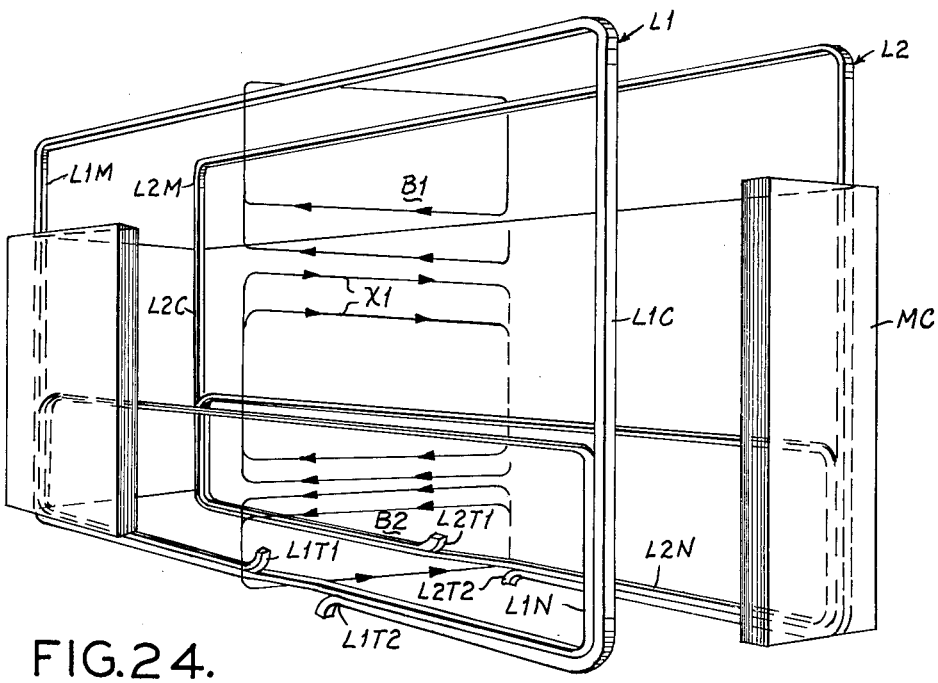
Figure 25:
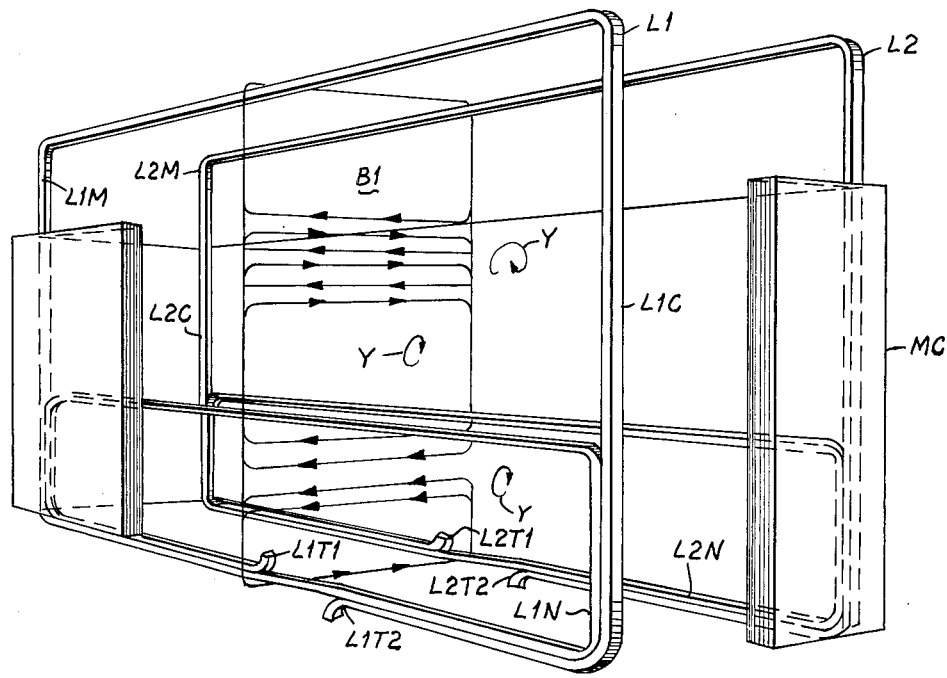
Figure 26:
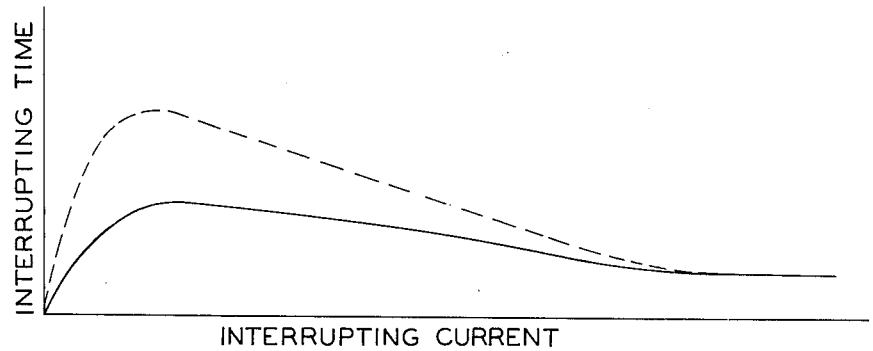

FIGS. 16—22 are diagrammatic views illustrating the current paths during various stages of circuit interruption;

FIGS. 23—25 are diagrammatic perspective views illustrating exemplary magnetic field patterns during the breaking and extinction operation of the magnetic blow-out structure of this invention at various interruption current values; and FIG. 26 is a graph comparatively showing interrupting time versus interrupting current characteristic curves for a typical prior-art interrupter and an interrupter of the present invention.

Corresponding reference characters indicate corresponding parts throughout the several views of the drawings.

Essentially, circuit interrupters or breakers of this invention, as well as conventional interrupters of this type, include a switch assembly for opening or breaking the circuit, an operating assembly for actuating the switch assembly, and an interrupter assembly for extinguishing an arc produced during opening operation of the switch assembly. These three assemblies are mounted on a carriage which is adapted for sliding movement into and out of one compartment of a metal-clad enclosure or housing in another compartment of which the incoming power cables and load supplying bus terminate. As will be understood, the primary function of circuit interrupters of this type is to electrically interconnect these power cables and bus under normal load conditions and to quickly, safely and effectively interrupt this electrical interconnection upon the occurrence of a fault or current overload, thereby preventing damage to equipment on the lines. Also, the arcs produced by these interruptions must be quickly extinguished to prevent damage to the circuit interrupter itself. In this regard, circuit interrupters of the air-magnetic type utilize electromagnetic forces derived from the energy of the arc produced during the circuit interruption to force the arc away from the switching contacts and into an arc chute assembly where the arc is extinguished. A blast of air, provided by a puffer device, is directed at the initial arc formed by the separating interrupter contacts as they first part to aid in moving of the arc away from the contacts.

One of the disadvantages heretofore encountered with circuit interrupters of this type has been that the arc produced by the opening of the contacts, when the amount of current flowing through the lines was only slightly above the predetermined maximum permissible current flow, would tend to remain in the lower portion of the arc chute, thus damaging the components of the interrupter located in this region and prolonging the interruption time. The reason for this phenomenon was that the low current arc produced by low fault currents would not create a strong enough field to force the arc up the arc chute. Conversely, an arc produced by high overload or fault currents would be forced to the top of the arc chute before the arc was cooled and deionized, which could cause restriking or flashover to ground.

Another difficulty in existing interrupters of this type is the tendency for the load-carrying components, particularly in the regions of the separable contacts of the switch assembly and the primary disconnects, to heat and develop excessive temperature levels. This is due to the resistance in the electrical paths across mechanically separable parts such as the switch or breaker contacts and the primary disconnects.

Still another problem present in existing breakers of this type is the provision of supplying an ample properly directed blast of air toward the arc at the proper time just after the contacts part. The pneumatic devices or puffers hitherto used have been bulky and have caused difficulties in design parameters, such as minimizing inertia and mass in various movable parts.

In accordance with this invention circuit interrupters are provided which overcome these disadvantages, difficulties and problems of existing interrupters.

Figure 1:
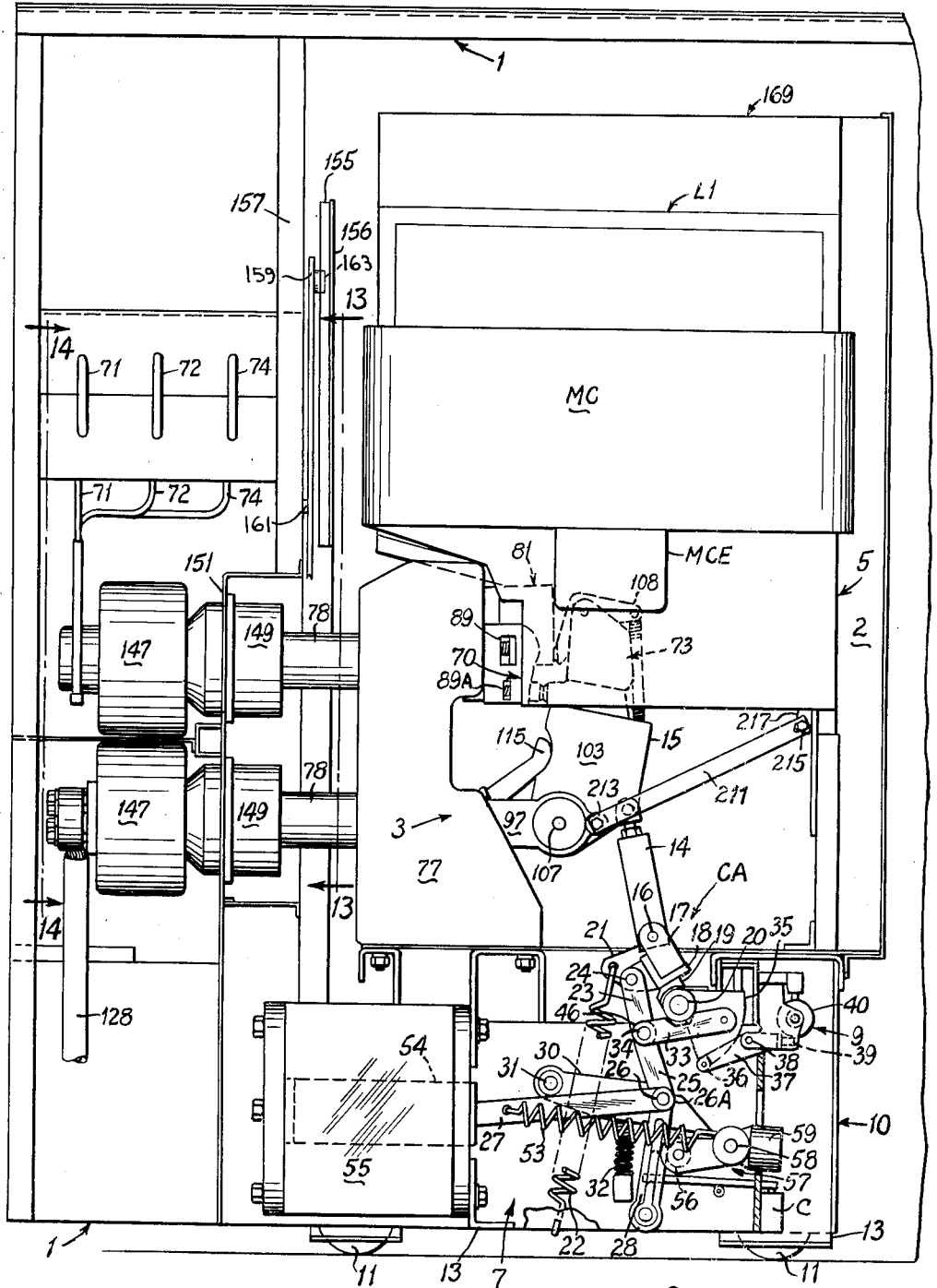
FIG. 1 is a side elevation, partly broken away, showing a circuit interrupter of this invention.

Referring now to FIG. 1 of the drawings, a circuit interrupter of this invention is shown incorporated in a compartmented metal enclosure or housing generally indicated at 1. This housing and circuit interrupter together with its associated components constitute one unit of metal-clad switchgear. Housing 1 has a front chamber or breaker compartment 2 in which are mounted, in a spaced side-by-side relationship, three identical switch assemblies 3, each of which has hingedly affixed thereto an identical arc chute assembly 5. The interrupter also includes an operating mechanism 7 and an overcurrent tripping device 9. The three switch assemblies 3, one for each phase of a conventional three-phase system, are mechanically linked for concurrent actuation by the operating mechanism 7 when tripping device 9 is energized in response to a fault. The three arc chute assemblies 5 and switch assemblies 3, together with the operating mechanism 7 and the tripping device 9 are mounted on a frame 13 affixed to a carriage 10 having wheels 11. The circuit interrupter may thus be conveniently moved out of and returned to breaker compartment 2 of housing 1 to permit inspection and maintenance.

The various assemblies of the circuit interrupter will be described in an order proceeding generally from the bottom toward the top of the apparatus.

Figure 2:
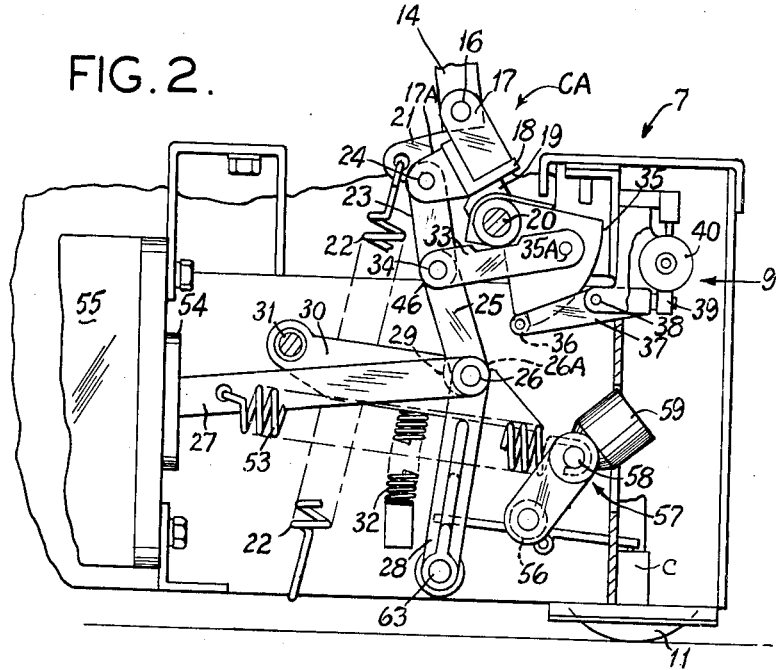
FIG. 2 is an enlarged fragmentary view of the operating mechanism of the circuit interrupter of FIG. 1 as it appears when the contacts are closed.

The operating mechanism 7 is operatively linked by three insulated operating rods 14 to the respective three identical switch assemblies 3. In FIGS. 1, 2 and 6 a movable switch arm 15 of each assembly 3 is shown in a circuit-closed condition, being moved into and held in that position by its operating rod 14. Operating mechanism 7 when actuated will move the lower end of rod 14 downwardly to the position shown in FIGS. 3–5, thus simultaneously moving the switch arms 15 to a circuit-open condition. These opening and closing actions are accomplished by a system of toggles, latches and links which are components of the operating mechanism 7 and are described hereinafter.

The lower end of each operating rod 14 is pivotally linked to a pin 16 carried at the end of a crank arm 17. These three crank arms are rigidly joined in a parallel side-by-side relationship by a cross bar 18 of L-shaped cross section. The assembly of bar 18 and the crank arms 17 is pivoted by means of arms 19 on a fixed cross shaft 20 and are components of a crank assembly CA. This crank assembly CA is further provided with a pair of ears 21 to which are connected springs 22 serving to bias assembly CA toward a switch-open condition with the crank arms 17 and operating rods 14 in the position shown in FIGS. 3–5. A toggle including two pairs of spaced parallel links 23 and 25 is provided to move the crank assembly between its two positions and to retain it in a switch-closed condition as shown in FIGS. 1, 2 and 6. The upper ends of links 23 are connected by means of a pin 24 to the end of another crank arm 17A projecting from the bar 18 of the crank assembly. The lower ends of links 25 are connected by a pin 26 to the junction of a pair of parallel links 27 and a pair of parallel links 28. Pin 26 carries a roller 26A which is cradled in a notch 29 of a closing latch 30. The rearward end of latch 30 is pivoted on a second fixed cross shaft 31 and it is biased upwardly or in a counterclockwise direction by a spring 32.

The toggle constituted by links 23 and 25 is maintained in its extended position (FIGS. 1 and 2) by means of a pair of parallel spaced-apart links 33, the left ends of which are connected to the toggle knee constituted by a pin 34. The other ends of links 33 are connected to a sector-shaped tripping cam 35 by means of a pin 35A. This tripping cam is also pivoted on cross shaft 20 and is held in its restrained or counterclockwise position, as shown in FIGS. 1 and 2, by means of a roller catch 36 mounted on the rearward end of a tripping lever 37 pivoted at 38. The forward end of lever 37 carries a follower 39 which engages a cylindrical base portion of a generally conically shaped cam 40. This cam 40 is biased by a spring 41 toward the right (as viewed in FIG. 12), thus holding tripping lever 37 in the generally horizontal position shown in FIGS. 1 and 2 to hold cam 35 in its counterclockwise position and to maintain the toggle comprising links 23, 25 extended.

The tripping lever 37, cam 40, its biasing spring 41, a tripping coil 42 and a plunger 43 of coil 42 constitute tripping device 9. The solenoidal tripping coil 42 is attached to frame 13 and is adapted to be energized by conventional control circuitry, not shown, upon the occurrence of an overcurrent or fault current condition on the load circuit supplied by the bus. Upon energization of coil 42 plunger 43 is moved to the left (FIG. 12) which pushes cam 40 against the bias of spring 41 and permits tripping lever 37 to pivot counterclockwise, whereupon roller catch 36 is disengaged from the notch of tripping cam 35. As the crank assembly CA including crank arms 17 is biased by springs 22 to rotate counterclockwise about cross shaft 20, the release of cam 35 causes the collapse of the toggle comprising links 23, 25 and permits this crank assembly to rock from its FIGS. 1 and 2 position (circuit-closed condition of switch arm 15) to its FIG. 3 position (circuit-open condition of switch arm 15). Buffers 44 (FIG. 5), connected to cranks 45 (also affixed to bar 18 and part of the crank assembly CA), cushion the shock of the collapsing toggle and the mechanical forces developed as operating rods 14 move downwardly to open switch arms 15.

Figure 3:
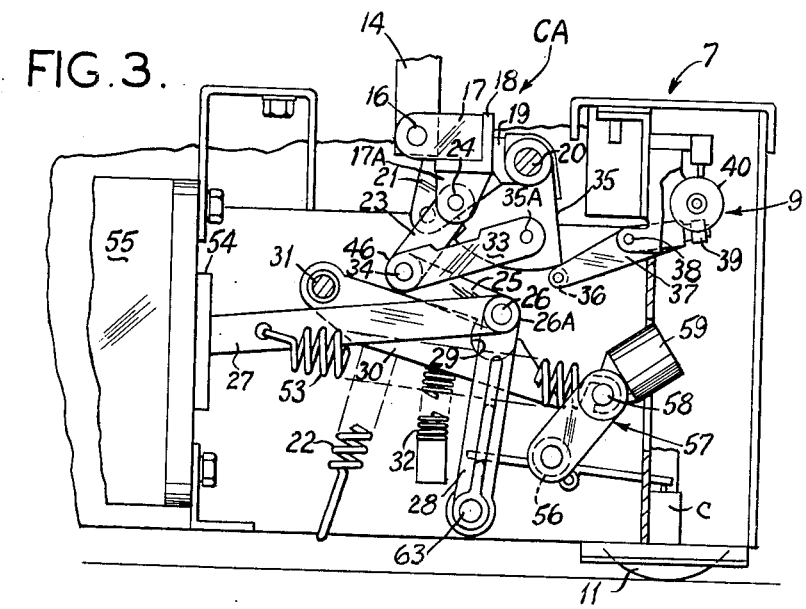
FIG. 3 is an enlarged fragmentary view of the operating mechanism taken just after the contacts have opened.

As best viewed in FIG. 3, which illustrates a trip-free condition of operating mechanism 7, a roller 46 (mounted at the knee of the collapsing toggle of links 23 and 25) engages the upper surface of closing latch 30 and forces this latch downwardly (i.e., rotates it clockwise about shaft 31 and against the bias of the closing latch spring 32), thus releasing roller 26A from the notch 29. Roller 26A, as stated above, is mounted on pin 26 which constitutes the knee of a second toggle comprising links 25 and 28. The release of roller 26A from notch 29 permits links 27 to move to the right from the position shown in FIGS. 1–3 to that illustrated in FIG. 4, due to the biasing action on link 27 by springs 53. Thus, this second toggle is moved from an erect or extended position (FIGS. 1 and 2) to a collapsed condition (FIG. 3) and moves closing links 27 to the right to partially withdraw an armature 54 from the bore of closing solenoid 55. The travel of closing links 27 is stopped by engagement of the forward edges of links 28 against rollers 56 (FIG. 4). These rollers are carried on the inner end of a manual closing lever 57 pivoted on a third cross shaft 58. The outer end of closing lever 57 is constituted by a socket 59 into which a removable operating handle 61 (FIG. 4) may be inserted for manual closing operation.

It will be noted in FIG. 4, which illustrates the open or reset position of operating mechanism 7, that the upper toggle (links 23 and 25) has assumed an extended condition, while cam 35 and tripping lever 37 have returned to their FIG. 2 position, i.e., with roller 36 engaged in the notch of cam 35. The second toggle (links 25 and 28) remains in a collapsed or folded condition. In order to move the switch arms 15 to their circuit-closed positions, this second toggle must be extended to assume its FIG. 2 position without collapse of the first toggle. This is normally accomplished electrically by energizing solenoid 55 with conventional control circuitry to move armature 54 and closing links 27 to the left. As the lower ends of links 28 are pinned to frame 13, as indicated at 63, roller, 26A will be moved to the left to return to its cradled position in notch 29. The first toggle being restrained by link 33 (which pivots about pin 35A fixed in the poistion shown in FIG. 4) moves while in an extended condition from its FIG. 4 position to that of FIG. 2, causing crank assembly CA to rock clockwise around cross shaft 20. This restores the two toggles, constituted by the column of links 23, 25 and 28, to their extended position with operating rods 14 holding switch arms 15 in their circuit-closed condition. The parameters of the components of this mechanism are such that maximum torque is provided at the end of the stroke of solenoid armature 54 to insure positive closing of the contacts of switch assemblies 3.

The closing operation may be accomplished manually by inserting the end of operating handle 61 into socket 59 of closing lever 57 and moving the outer end downwardly, which causes rollers 56 to rotate links 28 counterclockwise about pin 63. The tripping device 9 can also be manually actuated by means of a trip handle 65 secured to an extension 66 of plunger 43, which when manually moved to the left (FIG. 12) will trip the operating mechanism 7.

It will be noted that the axis of movement of cam 40 and plunger 43 of tripping coil 42 is horizontal and normal to the vertical plane of movement of the switch arms 15. Thus, any tendency for the tripping lever 37 to be jarred from its circuit-closed position of FIGS. 1 and 2 by the physical shock of arms 15 reclosing is avoided inasmuch as roller 39 is positively held downwardly by the cylindrical portion of cam 40 which is not susceptible to shock in the plane of movement of switch arms 15.

Tripping device 9 is provided with a safety trip or interlock mechanism S to prevent any possibility of moving the carriage 10 outwardly from its compartment 2 with switch arm 15 in their circuit-closed condition, such as for example when the carriage 10 is moved from an operating to a test position within housing 1. Mechanism S comprises a push-rod 47 carrying a roller 48 at its lower end and biased downwardly. The upper end of rod 47 bears against an arm 49 of a crank 50 pivoted to frame 13 at 51. A forked upper arm 52 of crank 50 is adapted to move cam 40 to the left any time roller 48 is moved upwardly from the position shown in FIG. 12. A conventional cut-off mechanism C is provided to cut off the power to solenoid 55 just before its armature has reached the retracted position shown in FIGS. 1 and 2.

Proceeding now to the switch assemblies 3 which are mounted above operating mechanism 7, only one phase or switch assembly 3 of this circuit interrupter will be described, as it is identical to the other two switch assemblies. Referring now more particularly to FIG. 6, a switch assembly 3 includes upper and lower primary conductors 67 and 69, a relatively stationary contact assembly 70, a movable contact assembly 73 and a puffer mechanism 75.

Primary conductors 67 and 69 are hollow metal tubes mounted in a parallel vertically spaced-apart relation in a base 77 cast of a flame retardant and track resistant fiberglass-polyester insulation. Insulating sleeves 78 surround all but the extreme forward and rearward ends of conductors 67 and 69. The rearward ends of conductors 67 are adapted to be connected to three bus conductors indicated at 71, 72 and 74 in FIG. 1 as will be more fully described hereinafter.

Relatively stationary contact assembly 70 constitutes a contact which is secured to the forward end of upper conductor 67. Assembly 70 includes a conductive inverted generally J-shaped contact support or body 81 constituted by a heavy metal plate 81A and a hook-shaped conductive member 81B secured together by bolts 81C. Plate 81A is attached as by silver brazing at its lower rearward surface, as indicated at SB (FIG. 8), to a heavy metallic head or cap 82. The rearward face of plate 81A is spaced away from the forward face of cap 82 to provide an insulating slit 88 above the brazed area SB for purposes to be described hereinafter. Thus the contact mount 70 has a transverse slit 88 adjacent its proximal end and a much longer transverse notch adjacent its distal end opening in a direction opposite to that of slit 88. Cap 82 is mounted on the front of hollow primary conductor 67 and secured to the insulating base casting 77 by bolts 77A. Conductive member 81B of body 81 carries a stationary arcing contact 83. Main contact 84 is constituted by the lower forward portion of a generally L-shaped contact carrying member or arm 85 having a shoulder 85A which is rockably engaged against the inner concave face of the hook portion of body 81. Contact arm 85 is biased to the right by a pair of upper and lower springs 86. The upper spring 86 insures low resistance electrical connection between main contact shoulder 85A and body 81, while the lower spring 86 biases the lower forward end of arm 85 to rock counterclockwise about the area of contact between 85A and 81. These springs 86 are suitably insulated from plate 81A and contact arm 85 to prevent current from traversing them. A pair of side retainer plates 87 span the notch in which the upper end of arm 85 is carried. These plates are attached to sides of plate 81A of body 81.

Figure 8:
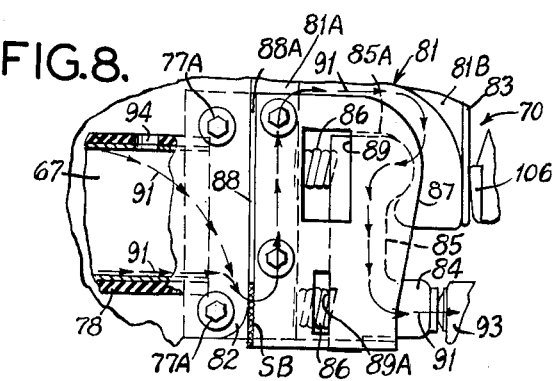
FIG. 8 is an enlarged fragmentary side elevation of a portion of FIG. 6.

Each of the retainer plates 87 is preferably provided with rectangular-shaped apertures 89 and 89A (FIGS. 6 and 8). These apertures not only permit inspection of the springs 86, but aperture or window 89A provides an alignment guide or gauge to determine whether proper contact pressure is being maintained between main contacts 84 and 93. Proper contact pressure exists when the rear face of contact arm 85 is aligned with the right edge of aperture 89A, as illustrated in FIG. 8.

A strip 88A of insulation material (such as "Mylar," fiberglass-polyester or melamine resin material) is preferably positioned in the insulating slit 88 provided between the forward surface of cap 82 and the rear surface of plate 81A. This insulating gap or slit 88 and the insulated springs 86 effect a current path configuration between the primary conductor 67 and the main contacts 84 which provides advantageous results. This is illustrated by current path 91 between the main contact 84 and gap 88. This current path, as illustrated in FIG. 8, because of insulating slit 88 and insulating springs 86, must follow an inverted configuration in traversing main contact arm 85 and members 81B and 81A of body 81. The magnetic forces developed by this current path configuration provide a magnetic blow-on force reinforcing the biasing action of lower spring 86 to bias main contact 84 to the right, thereby creating improved contact pressure and minimizing contact resistance between main contact 84 and its mating movable main contact 93. This action not only minimizes heating of the mating main contacts but prevents contact erosion and assures contact longevity and reduced maintenance. A substantial portion of any heat generated at the main and arcing contacts is absorbed by the J-shaped body 81 constituting the upper terminal block, which is effectively cooled by convection air currents coursing through the hollow upper primary conductor 67. A draft hole or passage 94 through the insulating sleeve 78 and conductor 67 is provided for the coursing of cooling air through the interior of conductor 67.

Movable contact assembly 73 is mounted at the outer end of switch arm 15, the lower end of which is pivotally and electrically connected to lower primary conductor 69 by means of a fitting 92. This fitting is provided with a socket 95 which receives and is secured to the forward or proximal end of primary conductor 69. Fitting 92 is also provided with a pair of spaced-apart parallel arms 97 extending forwardly and having apertures 99 adapted to receive a pair of concentric bosses 101 secured to the lower ends of a pair of switch arm side plates 103. Bosses 101 are journalled in the apertured ends of clevis arms 97 by means of a set of several annular coiled conductive springs 105. These bosses and springs not only constitute a mechanical bearing for the pivotal movement of arm 15 about a pivot point 107, but also provide electrical continuity between switch arm 15 and lower primary conductor 69 without the use of flexible metallic conductor braid. Movable main contact 93 is affixed to the upper ends of switch arm side plates 103. A movable arcing contact 106, adapted to mate with fixed arcing contact 83, is mounted on one end of a crank 108. This crank is pivotally mounted on a pin 109 carried by upper side plates 110 of switch arm 15 and in registering cross holes of the upper trifurcated end of an L-shaped bracket 112 secured to the upper surface of movable main contact 93. Plates 110 are also attached to the upper portion of movable main contact 93. A pair of springs 111 connected between the other end of crank 108 and side plates 103 bias movable arcing contact 106 clockwise about its pivot pin 109 and against arcing contact 83. Annular conductive coiled springs (similar to springs 105) are also utilized in the journal bearing between crank arm 108 and bracket 112 to insure good electrical continuity. Inasmuch as the current through switch arm 15 and stationary arcing contact 83 traverses as inverted U-shaped path through the vertically extending leg of bracket 112 and the contact-carrying arm of crank 108, magnetic blow-on forces between arcing contacts 83 and 109 are developed to reinforce the biasing action of springs 111.

In order to provide for convenient adjustment of the contact pressure between main contacts 84 and 93, a threaded adjustable link connection 113 is employed to interconnect switch arm 15 and operating rod 14. Connection 113 is adjusted until the rear face of contact arm 85 is aligned with the right edge of aperture 89A (FIG. 8).

The puffer mechanism 75, which is actuated by movement of switch arm 15 to a circuit-open position, is incorporated in the assembly of the hollow lower primary conductor 69 and its attached fitting 92. This fitting has a passage 114 (FIG. 6) to provide communication between the interior of conductor 69 and a nozzle 115 of insulating material secured thereto. Nozzle 115 is stationary relative to the breaker assembly and is positioned to direct a blast of air upwardly between the arcing contacts 83 and 106 as they separate. A piston 117 is slidable within conductor 69 and carries a sealing ring 117A, preferably formed from a self-lubricating material such as a fluoroethylene type polymer, e.g., "Teflon." Piston 117 is connected by means of a piston rod 119, which extends through a central axial bore of fitting 92, and carries an inverted U-shaped collar 123 at its outer end. Collar 123 straddles a pin 122 which interconnects the lower ends of a pair of drive links 121. The upper ends of the parallel spaced-apart links 121 are pivotally attached as indicated at 124 to the upper end of stationary nozzle 115. Each of the links 121 has an elongate slot 125 adapted to receive a pin 127 which extends between side plates 103 of switch arm 15.

When switch arm 15 is moved from its circuit-closed position, as illustrated in FIGS. 6 and 7, to its circuit-open position, pin 127 moves in an arcuate path clockwise around pivot 107 to draw pin 122 to the right and thereby actuate piston 117 to force a blast of air from nozzle 115 toward the separating contacts. It will be noted that the movement of piston 117 is not linear relative to time, i.e., during the first few degrees of movement of pin 127 in slot 125 piston 117 is moved a smaller distance than during the next few degrees of movement of pin 127. This provides for maximum delivery of air between the separating arcing contacts 83 and 106, at the instant of opening which is delayed relative to the initial movement of switch arm 15 because of the action of crank arm 108 prolonging the separating of these arcing contacts until the main contacts 84 and 101 are well separated. It will be understood that many other kinematic linkage systems will be apparent to those skilled in this art that will also satisfactorily function to move piston 117 to the right along the bore of lower primary conductor 69 in response to opening movement of switch arm 15.

Figure 15:
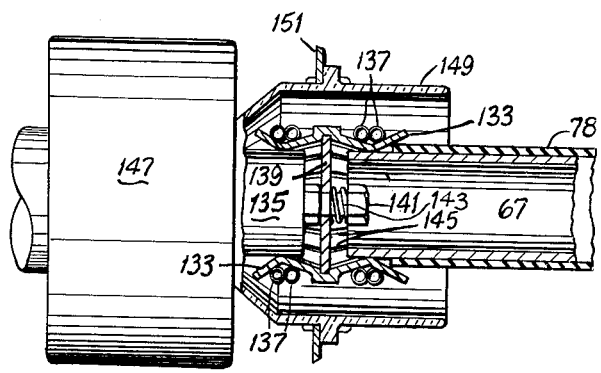
FIG. 15 is an enlarged vertical section taken on line 15—15 of FIG. 13, with a primary disconnect shown in operative position.

The electrical circuit between the three bus conductors 71, 72, and 74, which supply power to the electrical load, and three incoming power cables 128, 129 and 131 is completed to the respective three upper and three lower primary conductors 67 and 69 by means of primary disconnect devices (FIGS. 1, 13 and 15), all of which are identical to that illustrated in FIG. 15. Each device is constituted by a cluster of double-ended finger contacts 133 which extend in opposite directions coaxial with the bore of the primary conductor and having inner surface portions which peripherally grip the outer bared surfaces of the end of the primary conductor, and the outer surfaces of a bared end of a conductor extension 135. In order to maintain good low resistance electrical contact between fingers 133 and an interconnected conductor 67 and conductor extension 135, a number of garter springs 137 are provided to supply substantial inward biasing forces on the distal ends of the contact fingers 133. The cluster of fingers is supported coaxially by means of a centering disc 139 affixed by means of a cap screw 141 and a biasing spring 143, the screw being threadably engaged with the end of conductor extension 135. Each of these primary disconnects including fingers 133 etc. provides self-aligning interconnection wherein the tulip configuration of these fingers readily and effectively receives and grips the end of its respective primary conductor when the latter is moved into engagement therewith. It will be noted that the lateral spacing between adjacent fingers 133 provides a series of peripheral slots 145 which constitute passages for the coursing of cooling air through the hollow interior of conductor 67.

Figure 14:
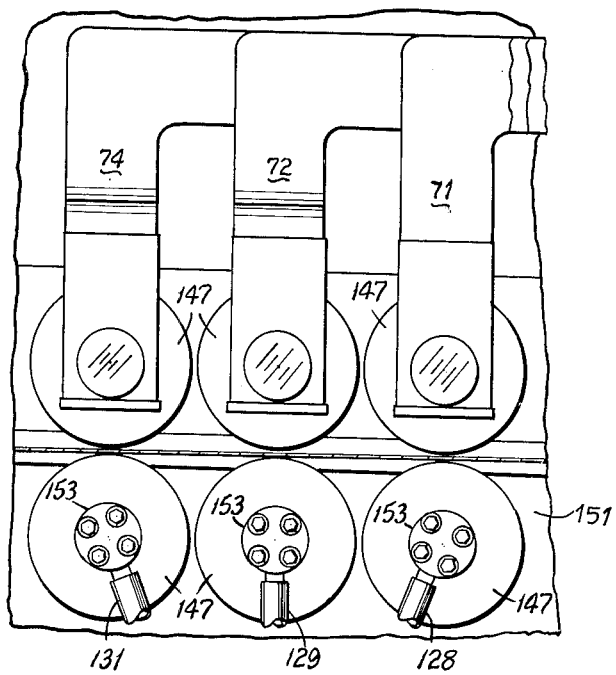
FIG. 14 is a vertical section taken on line 14—14 of FIG. 1.

Each of the conductor extensions 135 is provided (FIGS. 13–15) with an individual current transformer 147 and a shielding insulating sleeve 149, the latter being supported by and projecting through a panel 151 of housing 1. The rearward ends of the lower three primary conductor extensions 135 are each provided with a rotatable connector clamp 153. As is illustrated in FIG. 14, these clamps are conveniently adjustable to receive and be connected to the ends of power cables 128, 129 and 131 regardless of their lateral approach angle, which avoids undue cable bending and minimizes the length of cables necessary for connection to the metal-clad switchgear embodying the features of the circuit interrupter of this invention.

As it is desirable to provide for convenient inspection of the various components of the circuit interrupter while maintaining a safe working environment for operating personnel, a vertical shutter panel 155 (the front face of which is preferably covered by sheet of insulating material 156) is slidably attached to the front surface of a wall 157 which divides the front or breaker compartment 2 of housing 1 from the cable and bus compartments at the rear (FIGS. 1 and 13). Shutter 155 is held in a raised position, as shown in FIGS. 1 and 13, by means of mechanism including an arm 159 pivoted at 161 to wall 157. The upper end of arm 159 carries a roller 163 engaged in a slot 165 of panel 155. The lower end of arm 159 is linked to a push rod 167. The insulated panel 155 is gravity-biased downwardly so that only when push rod 167 is actuated by a cam arrangement (not shown) affixed to housing 1 is panel 155 raised to its upper position. Thus when the carriage is drawn outwardly from housing 1, the shutter barrier assembly including shutter 155 and its associated mechanism functions to prevent operating personnel from inadvertently contacting the high potentials present at the three lower conductor extensions 135.

The assemblies and components thereof heretofore described comprise apparatus which will function to maintain circuit continuity between the buses 71, 72 and 74 and the power supplying cables 128, 129 and 131, and to break or open this circuit upon the occurrence of a fault or overload condition in the electrical load energized by the buses. Also illustrated and discussed above are various novel features of this apparatus, such as the tripping device 9; the continuous cooling arrangement for primary conductors 67; the primary disconnects and the stationary contact assembly 70; the unique current path configuration through contact assembly 70 insuring high blow-on forces to minimize contact resistance, erosion and heating; the contact alignment provision utilizing the edge of aperture 89A in side plate 87; and the compact, low-mass puffer assembly 75. Three arc chute assemblies 5, which function to break and promptly and safely extinguish the arc formed during both normal switching and abnormal or overload circuit-breaking operations, are all identical, and therefore a description of one will suffice as to all.

Figure 9:
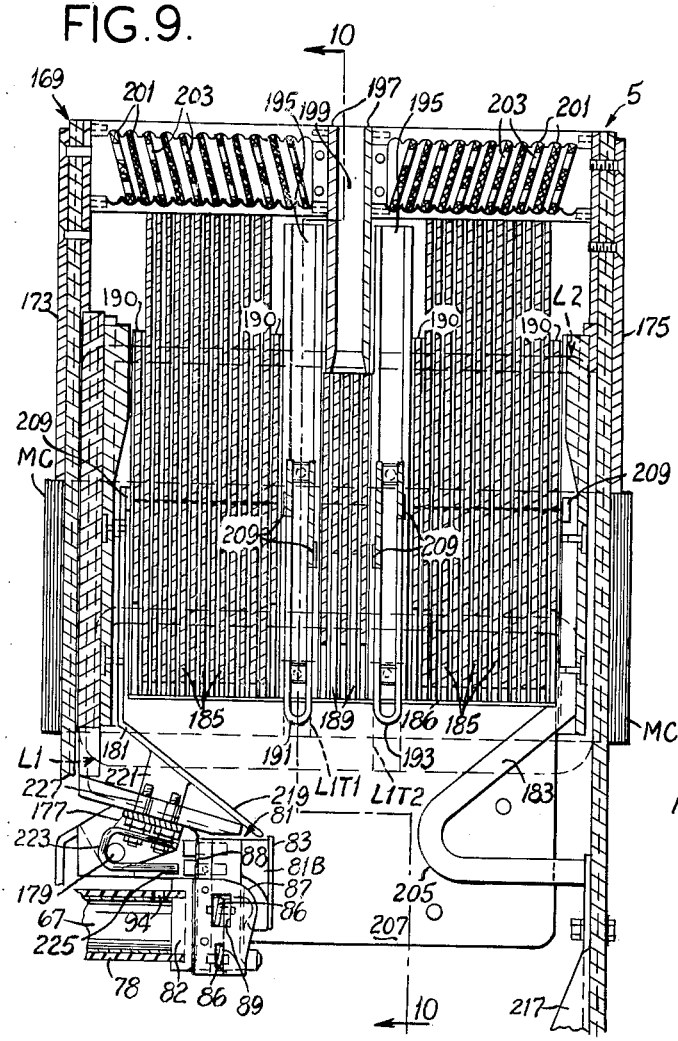
FIG. 9 is a longitudinal vertical section, with certain parts shown in elevation, of the interrupting or arc chute assembly.
Figure 10:
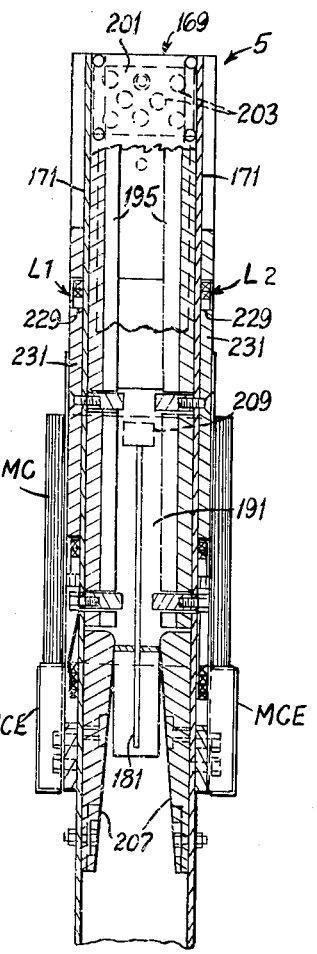
FIG. 10 is a section taken on line 10—10 of FIG. 9.

Referring now to FIGS. 9 and 10, each assembly 5 includes an arc chute housing 169 preferably fabricated from flame-retardant and track-resistant fiberglass-polyester material and having vertical side walls 171 and vertical end walls 173 and 175. The entire arc chute housing 169 is pivotally mounted on the upper portion of insulating base 77 by means of an inverted U-shaped bracket 177 and a pin 179, so that it may be rotated counterclockwise (as viewed in FIGS. 1 and 9) to provide access to the contact assemblies when the carriage 10 is withdrawn from housing 1. Affixed interiorly of housing 1 is a conductive angularly bent rear arc runner 181 (secured to end wall 173), a conductive front arc runner 183 (affixed to end wall 175), and two groups of parallel spaced-apart insulating barrier plates 185, preferably fabricated of a refractory material such as zircon. The lower portion of each plate 185 is provided with a tapering, generally V-shaped asymmetrical, elongate slot 187, which converges upwardly from the lower end 186 of each plate. Plates 185 are arranged so that the apex 188 of each slot is laterally offset (FIG. 10A) relative to the apices 188 of the slots of the adjacent plates, thus providing an increasingly narrowed and tortuous path for the arc as it is moved upwardly in the chute. Four slightly shorter barrier plates having the same tapered slot configuration (but having the slot laterally displaced so that it is somewhat closer to the center line of the plates) are indicated at reference numeral 190. An intermediate group of spaced, parallel, insulating barrier plates 189 of the same general configuration as plates 185, but somewhat shorter in length, is mounted centrally in housing 169 spanning the chute width between side walls 171. The intermediate or central group of arc chute plates 189 (which constitutes a transfer stack) is separated from the two groups of plates 185 by two U-shaped intermediate conductive arc runners 191 and 193 and two pairs of vertical insulating channels 195. Runners 191 and 193 are positioned so that the bottom portions thereof extend somewhat below the lower edge of plates 189. A pair of insulating plates 197 which extend between side walls 171 in the area above the central group of arc plates 189 provides a chimney 199. At the upper ends of the two groups of barrier plates 185 are provided two groups of inclined baffle or deflecting plates 201, alternate ones of which are perforated as indicated at 203.

Front arc runner 183 of conductive material has a knee-shaped lower portion 205. Two solid insulating (preferably zircon) liners 207 of generally wedge shape are positioned below the lower edges of barrier plates 185 and 189 and affixed to the lower opposing inside surfaces of arc chute housing side walls 171. Each of the arc runners 181, 191, 193 and 183 is provided with a heavy-duty arcing contact portion 209, fabricated of silver-molybdenum alloy or the like, near each of its upper ends.

In order to provide the necessary and proper current paths between the upper and lower primary conductors 67 and 69 during arc-extinguishing operations, the rear arc runner 181 is electrically interconnected to conductor 67 (via a connection to the upper rear portion of body 81 of the stationary contact assembly 70) and the front arc runner 183 is connected to conductor 69 (via a connection with fitting 92). The intermediate arc runners 191 and 193 are floating electrically relative to conductors 67 and 69.

The interconnection between front arc runner 183 is constituted by a conductive bar 211 (FIG. 1) secured at its one end as indicated at 213 to an extension on the forward portion of one of the clevis arms 97 and affixed at its other end as indicated at 215 to an extension 217 of runner 205. Either of these connections 213 or 215 can be easily detached to permit pivoting the arc chute housing 169 and its associated components about the pivot point of pin 179 for inspection and maintenance. The interconnection between the obtusely angled lower leg 219 of rear arc runner 181 and the upper rear surface of the body 81 of stationary contact assembly 70 is provided by a stud 221 affixed to the undersurface of arc runner leg 219 at a point intermediate its ends; a length of heavy metallic flexible braid 223 bent into a C-shaped configuration; and bracket 225 bolted to plate 81A. Thus, the braid electrically connected at its one end to bracket 225 and at its other end by bolts 227 to stud 221 constitutes a flexible electrical conductor. The approximate midpoint interconnection of the stud 221 to the lower leg 219 of rear arc runner 181 defines a current path configuration, which as will be described hereinafter, is particularly advantageous.

Figure 11:
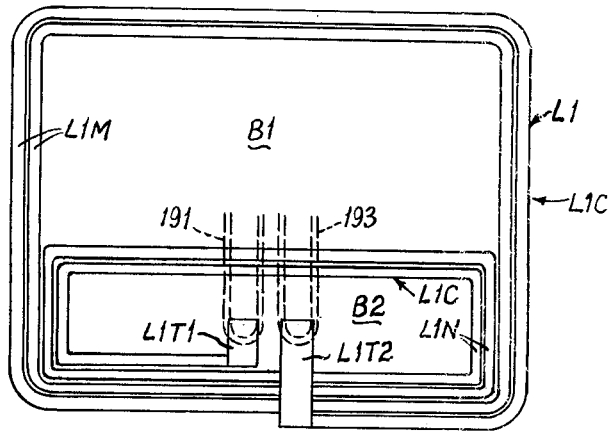
FIG. 11 is a side elevation of a blow-out coil of the interrupter.

A magnetic blow-out assembly (FIGS. 1, 9 and 11), including two compound face-wound coils L1 and L2, an annular laminated magnetic or magnetizable core MC, and laminated core extensions MCE, is affixed to and supported by arc chute housing 169. Core MC extends girthwise around arc chute 5 while extensions MCE extend downwardly from the midsection on opposite sides of MC. Both MC and MCE are preferably formed of grain-oriented silicon steel with the plane of the laminations vertically disposed. Each of the coils L1 and L2 is rigidly mounted flatwise against the outer surface of its respective wall 171 in channels 229 of panels 231. It will be understood that these coils may be cast in place in the side walls 171 of housing 169. The configuration of each of the identical coils L1 and L2 is essentially that of a block figure eight (FIG. 11) having an upper rectangular opening or field area B1 and a lower rectangular opening or field area B2. The latter area is defined by a smaller or inner two-turn loop L1N of a continuous insulated conductor L1C. Both areas B1 and B2 are defined by a larger two-turn loop L1M of conductor L1C. Area B1 is bounded by the confines of the upper portion of outer loop L1M and the upper portion of the inner loop L1N. The two ends of conductor L1C are respectively connected by strap terminal leads L1T1 and L1T2 to the intermediate arc runners 191 and 193. The analogous components of identical face-wound coil L2 are similarly referenced by using the character prefix "L2–" rather than "L1–."

Thus, the inner and outer loops L1N and L1M of the coil L1 are substantially coplanar and similarly so are the inner and outer loops L2N and L2M (FIG. 23) of coil L2, the two planes of the coils being substantially parallel. The inner loops L1N and L2N, which may be of the same number or an unequal number of turns relative to the outer loops L1M and L2M, are positioned on opposite sides of the arc chute adjacent a first or lower zone or region of the arc chute, while the outer loops L1M and L2M are positioned on opposite sides of the arc chute adjacent both a second or upper region as well as the lower region of the arc chute. The lower region of the arc chute is generally defined as the region extending upwardly from the elevation of the arcing contacts and therefore somewhat below the bottom of inner loops L1N and L2N up to a level of the top leg of loops L1N and L2N. The upper zone or region of arc chute 5 extends upwardly from the top of the lower region to an elevation somewhat higher than the top of loops L1M and L2M.

It will be noted that the two opposite sides or legs of the outer loops L1M and L2M are somewhat more than twice as long or high as the respective two sides of loops L1N and L2N, and thus the areas bounded by L1N and L2N are somewhat less than half as great as the areas bounded by L1M and L2M. The height and positioning of the core MC is preferably such that its upper edge extends upwardly past the top of the inner loops L1N and L2N and its lower edge is approximately at the same elevation as the bottoms of L1N and L2N, thus encompassing both the lower portion of the arc chute and a substantial part of the upper portion thereof.

Figure 16:
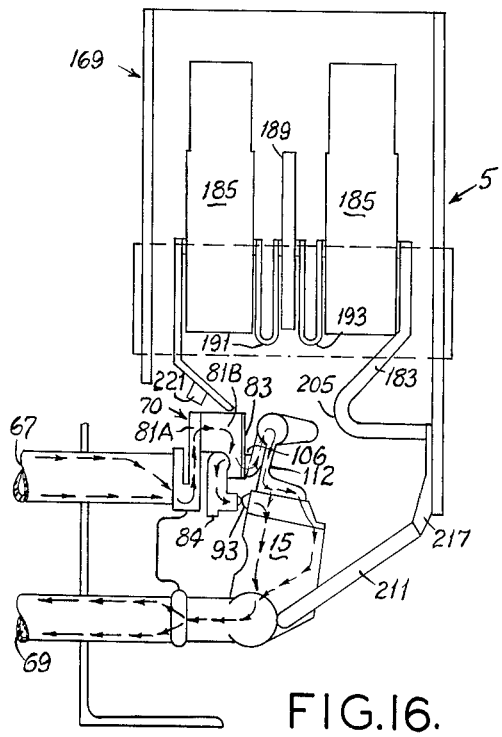
Figure 17:
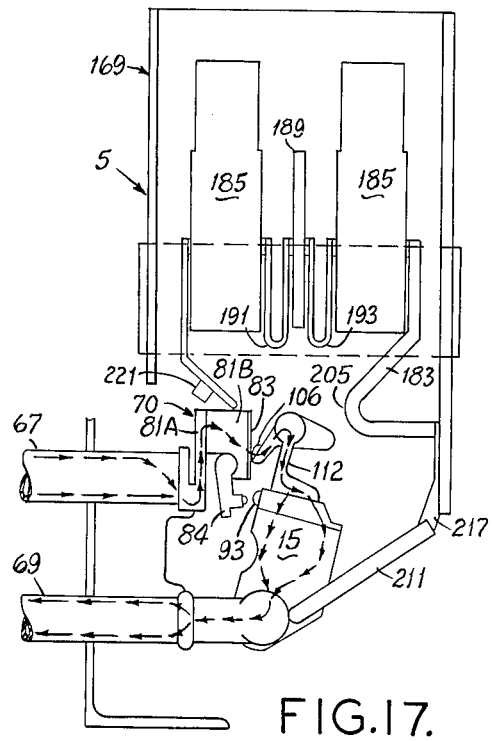

The function and operation of the operating mechanism 7 and switch assemblies 3 have already been described and thus will be referred to only generally in the following description of the operation of this air-magnetic circuit breaker exemplifying the features of this invention. Referring now to FIGS. 16–22, a circuit breaker of this invention is shown diagrammatically to illustrate the sequence of arc interruption. In FIG. 16, the dashed arrows indicate the current flow under normal operating conditions. The major current path between the switch arm 15 and the stationary contact assembly 70 is through the mating stationary main contact 84 and movable main contact 93. A minor amount of current may follow a path across the mating arcing contacts 83 and 106 which is in shunt, as indicated by the lighter dashed line, with the major current path through the main contacts. Upon the occurrence of a fault or an overload on the circuits supplied by bus conductors 71, 72 and 74 which increases the current level beyond a predetermined amount, tripping device 9 is electrically energized to actuate the operating mechanism 7, which utilizes the energy stored in springs 22 to simultaneously and rapidly move the three switch arms 15 from their described circuit-closed position in FIG. 16 toward a circuit-open position. FIG. 17 illustrates the initial opening movement of switch arm 15 showing that, after a small amount of following by stationary main contact 84, movable main contact 93 has separated from its mating contact 84, and all the current is traversing a path between arcing contacts 83 and 106. It will be seen that the following action of crank 108 delays the separation of arcing contact 106 from stationary arcing contact 83.

Figure 18:
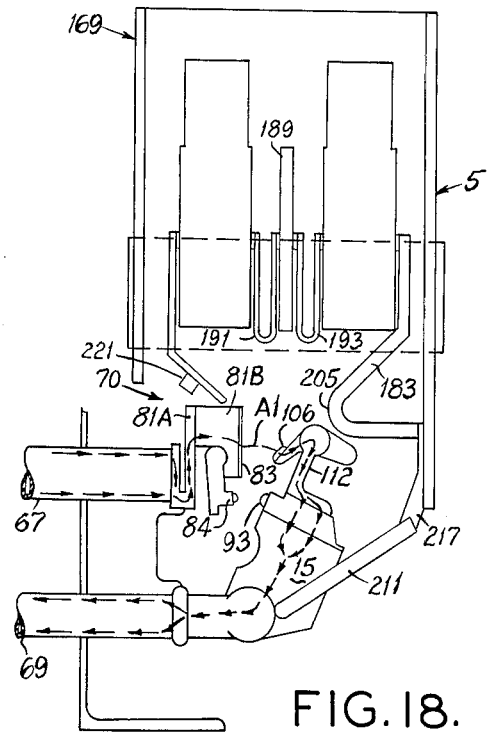
Figure 19:
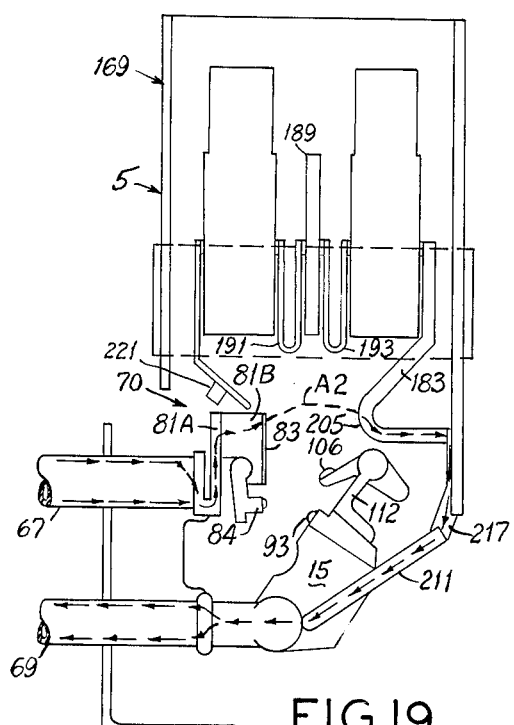

FIG. 18 illustrates the initial formation of an arc, indicated by dashed lines A1 between the now separated arcing contacts. The puffer mechanism 75 is at this time directing a properly-timed blast of air to move the arc upwardly into the arc interrupter 5. Also tending to accelerate the movement of arc A1 upwardly is the magnetic field developed by the current flowing through the inverted generally U-shaped path, the left portion of which is upward through plate 81A of contact body 81, and the right portion of which is downward through the trifurcated crank arm bracket 112 and switch arm 15. The base of the inverted U-shaped path is constituted by current flow through conductive member 81B and the arc A1. It will also be noted that the generally reverse C-shaped current path through conductor 67, stationary contact assembly 70, arc A1, switch arm 15 and lower primary conductor 69 effects a further magnetic field effect which assists in moving arc A1 upwardly. The field thus produced by current flow in this path exerts a powerful force to move the arc upwardly to the position shown in FIG. 19.

Figure 20:
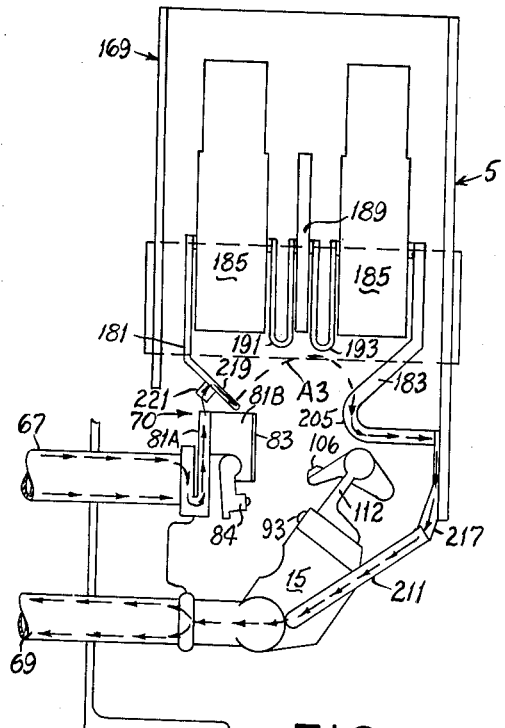
Figure 21:
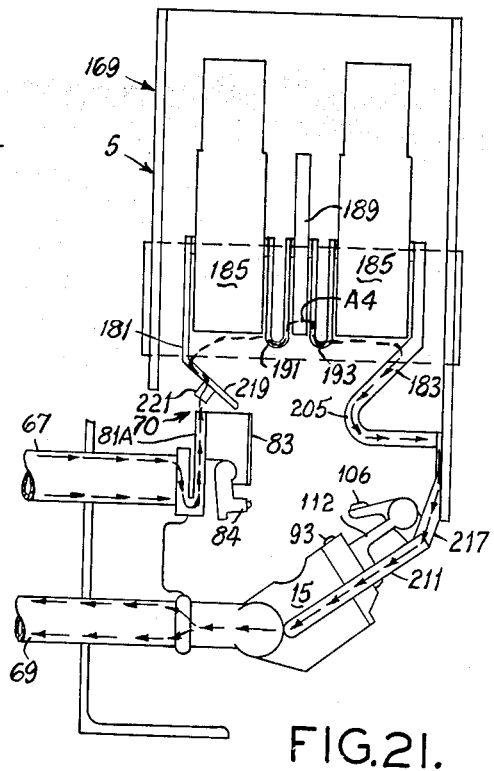

Switch arm 15 by moving close to the knee 205 of front arc runner 183 transfers the front end of the arc to the front arc runner 183 so that current then flows downwardly via front arc runner extension 217 and conductive bar 211 to the lower primary conductor 69. The configuration of the rising arc between stationary contact assembly 70 and front arc runner 183 is indicated at reference character A2 in FIG. 19. Under the magnetic field forces, and air blast forces previously described as well as the natural upward forces of convection the rear (left as viewed in FIGS. 9 and 16–22) end of the arc moves from the top of arcing contact 83 to the lower tip of lower leg 219 of the rear arc runner 181, as shown in FIG. 20. The forward (right as viewed in FIGS. 9 and 16–22) end of this arc moves upwardly along front arc runner 183. Inasmuch as the initial arc is formed to the rear of the vertical center line of arc chute housing 169, there is a tendency for the rear end of the arc to move upwardly into the rear group of arc chute or barrier plates 185 before the front end of the arc is moved upwardly into the forward group of barrier plates 185. Such action would be disadvantageous inasmuch as it would require the major portion of the arc energy to be dissipated in only one group of plates 185. The configuration of the lower leg 219 of rear arc runner 181 and the intermediate connection point of stud 221 thereto provides a current path configuration which develops a magnetic field tending to delay momentarily the upward movement of the rear end of the arc until the forward portion of the arc has risen sufficiently and started to arch or belly upwardly into the front group of barrier plates 185. The arc is illustratively shown at A3 in FIG. 20 with the rear end of this arc in contact with the lower tip of leg 219. The magnetic fields produced by the current flowing upwardly and forwardly via stud 221 and downwardly and forwardly in leg 219, and then upwardly and forwardly in leg 219, and then upwardly and forwardly through the rear portion of arc A3 develop a net magnetic field which tends to hold momentarily the rear portion of the arc at the lower tip of arc runner 181. The movement of the arc from its A2 to its A3 configuration is also affected by the laminated magnetic core extensions MCE. Although neither of the coils L1 and L2 is energized at this point in time, the magnetic reaction field produced by the arc moving upwardly between these spaced-apart magnetic core extensions MCE will tend to accelerate the movement of the central portion of the arc upwardly toward the intermediate arc runners 191 and 193.

As the arc moves upwardly from its A3 position, the central portion of the arc contacts the lower ends of the front and rear intermediate arc runners 191 and 193. When this occurs the resulting electrical potential difference between 191 and 193 causes current to flow in the continuous conductors L1C and L2C of the face wound coils L1 and L2. The current path through L1 and L2 is in shunt with the intermediate portion of the arc now rising in the transfer stack constituted by the central group of barrier plates 189. The general arc configuration at this juncture is shown generally at A4 in FIG. 21. As the central portion of arc A4 is rapidly cooled and extended as it moves upwardly between the tapering offset slots of the plates 189 of the transfer stack, the resistance is increased to the point where this portion of the arc is extinguished and all of the fault current is conducted through L1 and L2 which are parallel-connected across runners 191 and 193. This increase in current coursing through L1 and L2 sharply increases the magnetic field developed in the lower region or zone of the arc chute, i.e., between area B2 of coil L1 and the area B2 of coil L2. This magnetic field very rapidly moves the rear and forward arc portions upwardly in the tapering offset slots of both groups of barrier plates 185 thereby extending and cooling these arc portions.

Figure 22:
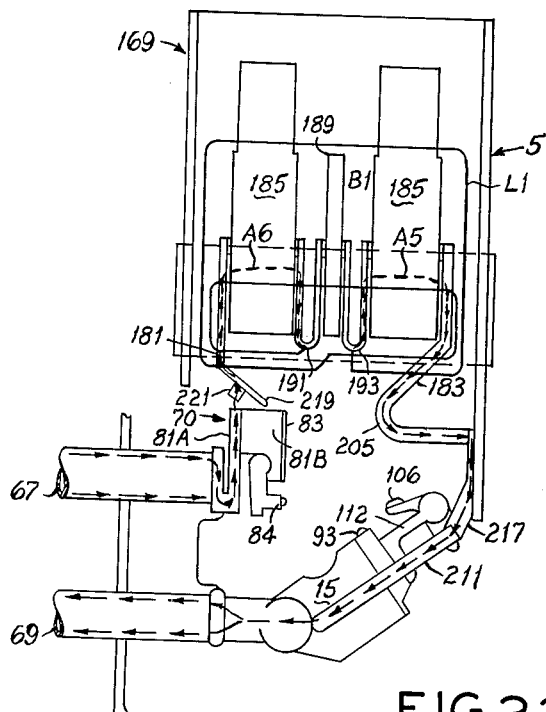

After the rapid acceleration of the remaining front and rear arc portions through the lower zone, these arc portions rise above the lower zone generally defined by the space between the smaller coil loops L1N and L2N, the arc (now a front segment or section A5 and a rear segment or section A6 as indicated in FIG. 22) moving into the upper zone between areas B1 of L1 and area B1 of L2. It will be noted that the horizontal line of junction between the bottom of area B1 and the top of area B2 is delineated by the top legs of the inner loops of L1 and L2 and this horizontal line of junction is somewhat below the elevation of the apices 188 of the offset tapered slots in barrier plates 185. Thus the arc segments or sections A5 and A6, being urged upwardly by both convection effects and the net magnetic field in the upper zone between field areas B1 of L1 and B1 of L2, are rapidly extended and cooled and move upwardly more slowly in this upper zone. This is due not only to the fact that the arc portions are forced to follow an increasingly narrowed and tortuous path, but also because the magnitude of the net magnetic field is controlled to effect a slower rise of these arc portions thereby insuring better arc extension, cooling and deionization. The arc portions A5 and A6 are extinguished, thus effecting dual arc interruption, and the hot gaseous products of the arc are cooled and deflected by the inclined baffle plates 201.

To further emphasize the important advantages and inventive features of the magnetic blow-out structures of this invention, the diagrammatic perspective views and magnetic field patterns illustrated exemplarily in FIGS. 23–25 are presented. Referring now more particularly to FIG. 23, a typical magnetic field pattern in a central lateral plane in the lower zone at a low fault current is shown. The magnetic fields produced by parallel current flow through the single continuous conductors L1C and L2C reinforce each other in the lower areas B2 to form a flux pattern as indicated by the arrows in the lower zone of the arc chute as shown in FIG. 23. That is, the field produced by the outer core loop and the inner core loop is strongest in B2 area. Thus, the flux field in the lower zone approximates the product of the amperes flowing through four turns of L1 and the four turns of L2. The effect of this lateral field in the lower zone is to exert a strong upward force against the electron and ion stream which makes up the arc as its axis is at right angles to this flux field. The return portion of the flux field is shown to be around the outer confines of the inner core loops L1N and L2N.

The laminated annular magnetic core MC is useful at these low overload or fault current levels not only to provide a lower reluctance return path but to more evenly distribute the flux field in the lower zone. It will be understood that the relative magnitude and distribution of the flux field in this lower zone is not illustrated because it would tend to obscure the principles described. Such field distribution and magnitude will, of course, be readily apparent to those skilled in this art.

Referring now to FIG. 24, an exemplary illustrative flux field is shown during interruption of an intermediate fault current. A typical field pattern in a central vertical plane of the arc chute is depicted here. As the current carried by L1 and L2 is greater than in FIG. 23, the ends or yoke portions of the magnetic core MC will tend to saturate. As the areas of the sides or legs of MC are much larger than the cross section of the yokes, saturation of the yokes is approached first with the result that an increasing amount of flux return will be laterally between the central portions of the areas B1 of L1 and L2 via the sides of MC as indicated at X1, rather than through the yoke portions of MC. Actually the net field effect in the upper zone may be more easily comprehended by noting that a lesser magnitude flux field is produced in this zone than would be the case if the yokes of core MC were not saturating. This resulting bucking field action in the upper zone at higher fault current levels inhibits a linear increase in magnetic field in this zone with an increase in current, and avoids the disadvantage of forcing the arcs upwardly through the barrier plates so rapidly that they will not cool and extinguish permanently, but tend to restrike.

At even higher fault current values the tendency of flux lines to stray outside the core MC is inhibited due to the reactive effect of counter M.M.F. induced by eddy currents (as indicated at Y in FIG. 25) in the vertically disposed laminations of the sides or legs of the core. This current-limiting reactor effect provides an important advantage inasmuch as interphase shielding or magnetic isolation between the three side-by-side arc chutes 5 is provided. This magnetic insulation between phases is especially important when interrupting unbalanced faults as the cores MC confine the respective magnetic fields by preventing stray flux from interacting between phases.

It will be noted that at these higher levels of fault currents the same flux field pattern will be present in the lower zone as shown in FIG. 23, but it is not specifically illustrated in FIGS. 24 and 25.

It will also be seen that not only does the magnetic blow-out structure of this invention insure efficient arc interruption over the full current range and provide magnetic shielding and insulation, but complete dielectric protection is also afforded. This is the result of having the face wound coils L1 and L2 on the outside of the arc chute rather than inside so that they are out of the arc interruption zone and thus physically isolated from contact with the arc and are completely thermally protected. Another advantage is the extreme flexibility or versatility of this construction. The number of turns of conductors L1C and L2C used to form the inner and outer loops of each face wound coil L1 and L2 may be varied widely, dependent on the particular desired design parameters. Thus, the inner core loops may have substantially more or less turns as well as an equal number relative to the outer loop. Moreover, further design versatility is provided in that the terminal leads L1T1, L1T2, L2T1 and L2T2 may be brought out at any convenient location around the peripheries of either the inner or outer loops, such as both at a corner or side, or at opposite corners or sides, etc., so that instead of being connected to floating intermediate arc runners on opposite sides of a central transfer stack, they may be conveniently electrically connected to permit use of an end or offset transfer stack and arc chute configurations where only a single arc is formed.

The effectiveness of the magnetic blow-out structure of this invention as associated with circuit interrupter apparatus as described is evidenced by the interrupting time-current curves of FIG. 26. The dashed-line curve represents a typical NEMA standard curve showing that the interrupting time at low fault currents is much greater than at higher fault currents. This indicates the difficulty in providing a strong enough magnetic field at low fault currents without having such a strong field at high fault currents that the arc will be too rapidly moved upwardly through the arc chute. The solid-line curve of FIG. 26 illustrates a typical time-current interruption characteristic of apparatus of the present invention showing efficient arc interruption over full current range. Interruption times for low fault currents are of substantially the same order as interruptions times for maximum fault currents. Breakers of the present invention having voltage ratings in the 5 kv. and 15 kv. class, for example, will reliably clear faults in the order of from somewhat over 1200 amperes (60 cycles) to 37,500 amperes (dependent on the current ratings of the particular breaker) in 3–5 cycles or less.

It will be understood that any conventional operating mechanism may be used for opening and reclosing the switch arms 15, e.g., the energy for reclosing could be supplied by an accumulator or stored energy system as the equivalent of the solenoid reclosing specifically described herein.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In a circuit interrupter having a pair of contacts adapted when separated to produce an electric arc therebetween; arc extinguishing means comprising an arc chute having a lower region through which the arc first moves and an upper region in which the arc is thereafter moved, a first compound coil on one side of said arc chute, a second compound coil on the side of said arc chute opposite said first coil, each coil comprising two loops of conductive material, the first loops being located on opposite sides of said arc chute adjacent said lower region, the second loops being located on opposite sides of the arc chute adjacent both the lower and upper regions of said arc chute, the loops in said first coil being substantially coplanar, the loops in said second coil being substantially coplanar, the planes of each of said coils being substantially parallel, first and second arc runners positioned within said chute adjacent opposite ends thereof, and first and second spaced-apart intermediate arc runners within said chute respectively spaced inwardly away from said first and second arc runners, each of said coils having first and second electrical terminals, said first terminals being commonly connected to said first intermediate arc runner, said second terminals being commonly connected to said second intermediate arc runner whereby at least a portion of the current carried by the arc is conducted in parallel through said coils and magnetic fields are thereby developed by said coils for magnetically moving said arc upwardly in said chute.

2. In a circuit interrupter as set forth in claim 1, the first loops each having at least one turn of conductive material and the second loops each having at least one turn of conductive material.

3. In a circuit interrupter as set forth in claim 2, each of said loops being generally rectangular in shape one pair of opposite sides of each of said second loops being at least twice as long as the respective pair of opposite sides of said first loops.

4. In a circuit interrupter as set forth in claim 3, said arc chute further including a plurality of spaced-apart substantially parallel vertically disposed intermediate barrier plates each extending crosswise within the arc chute, whereby a central portion of the arc is first extinguished thereby forming dual arc segments one of which moves upwardly in the portion of the arc chute between the first and first-intermediate arc runners and the other segment of which moves upwardly in the portion of the arc chute between the second and second-intermediate arc runners.

5. In a circuit interrupter as set forth in claim 4, said arc chute further including first and second groups of spaced-apart vertically disposed barrier plates each extending crosswise within the arc chute, the first group being positioned between said first and first-intermediate arc runners and the second group being positioned between said second and second-intermediate arc runners, the lower ends of said intermediate arc runners extending downwardly beyond the lower ends of all of said barrier plates.

6. In a circuit interrupter as set forth in claim 1, said arc extinguishing means further including an annular core of magnetizable material extending girthwise around the arc chute and said coils.

7. In a circuit interrupter as set forth in claim 6, said core comprising a plurality of vertically disposed laminations.

8. In a circuit interrupter as set forth in claim 6, said core girdling at least said lower region and extending upwardly so that it also encircles a portion of said upper region.

9. In a circuit interrupter as set forth in claim 6, magnetizable core extensions extending downwardly from opposite sides of said annular core.

10. In a circuit interrupter as set forth in claim 6, a plurality of spaced-apart substantially parallel vertically disposed barrier plates each extending crosswise within said arc chute and each having a tapered slot extending upwardly to an apex, the apices of alternate plates being laterally offset one from the other, the elevation of said apices relative to the arc chute being substantially the same as that of the top of said core.

11. In a circuit interrupter as set forth in claim 6, one of said contacts being connected to one end of a primary conductor by means of a contact mount; said first arc runner having a generally vertically disposed upper portion and a lower portion obtusely angled thereto, the lower end of said lower portion being adjacent said contact mount, and means electrically interconnecting said contact mount to said lower first arc runner portion at a point intermediate the ends thereof, whereby current traversing a path through said contact mount and said electrical interconnecting means and the lower arc runner portion and the portion of the arc contacting said lower end of said lower first arc runner portion develops a further magnetic field which transitorily delays movement of said portion of said arc upwardly through said lower region.

12. In a circuit interrupter having a first relatively stationary contact and a second contact separable therefrom to produce an electric arc therebetween; an elongate primary conductor, a contact mount at one end thereof extending axially away from said conductor, a transverse slit in said mount adjacent its proximal end providing on one side of said mount a restricted conductive path between the primary conductor and the distal end of said mount and an insulating gap on the other side thereof, a generally transverse notch adjacent the distal end of said contact mount opening in a direction opposite to that of said slit, a contact-carrying member having one end received in said notch and pivotable about said end, said first contact being constituted by a portion of the other end of said member and adapted to engage said second contact, spring means biasing the lower end of said contact-carrying member in a direction away from said primary conductor thereby to increase the contact pressure between said first and second contacts, said spring means being insulated thereby to restrict the current flow between the primary conductor and said first contact to a generally U-shaped path and thus develop a magnetic field which exerts additional biasing force on said first contact to supplement the biasing forces of said spring means, primary disconnect means on the other end of said primary conductor, said primary disconnect means having slots therethrough, said primary conductor being hollow and having an aperture adjacent said one end of the conductor thereby providing a passage for cooling air through said hollow conductor whereby heat transfer from said contact mount and said primary conductor is increased and the temperature thereof is reduced.

13. A circuit interrupter having a first relatively stationary contact and a second contact separable therefrom to produce an electric arc therebetween, said first contact being connected to one end of a primary conductor by means of a contact mount, primary disconnect means on the other end of said conductor, said conductor being hollow and providing an air passage therethrough whereby cooling air may flow past said primary disconnect means and said contact mount to reduce the temperatures thereof, a second primary conductor spaced away from said first primary conductor, a switch arm having one end pivotally attached to said second conductor and carrying said second contact on its other end, said second conductor also being hollow and constituting a cylinder, a piston mounted for reciprocal movement in said cylinder, a nozzle connected to said cylinder and directed toward said separable contacts, and means responsive to contact opening movement of said switch arm to move said piston in said cylinder whereby a blast of air is directed toward said arc to move it away from said contacts.

14. A circuit interrupter having a first relatively stationary contact and a second movable contact separable therefrom to produce an electric arc therebetween, a primary conductor, a switch arm having one end pivotally attached to said primary conductor and carrying said second contact on its other end, said conductor being hollow and constituting a cylinder, a piston mounted for reciprocal movement in said cylinder, a nozzle connected to said cylinder and directed toward said separable contacts, and means responsive to contact-opening movement of said switch arm to move said piston in said cylinder whereby a blast of air is directed toward said arc to move it away from said contacts.

15. A circuit interrupter as set forth in claim 14 in which said means comprises a mechanical linkage interconnecting said piston and said switch arm.

16. A circuit interrupter as set forth in claim 14 in which said nozzle is affixed to said primary conductor.

17. A circuit interrupter as set forth in claim 16 in which said means includes a piston rod movable axially in said conductor, and means slidably interconnecting said piston rod to said switch arm whereby the movement of the piston in said cylinder in response to movement of said switch arm is nonlinear relative to time.

References Cited by the Examiner

UNITED STATES PATENTS

| | | | |
|---|---|---|---|
| 1,762,604 | 6/30 | Ainsworth | 200—87 |
| 1,913,522 | 6/33 | Thompson et al. | 200—166 |
| 1,934,467 | 11/33 | Hopp. | |
| 1,948,658 | 2/34 | Gerin | 200—144 |
| 2,259,005 | 10/41 | Scott | 200—147 |
| 2,526,387 | 10/50 | Milliken | 200—144 |
| 2,555,799 | 6/51 | Lerstrup | 200—147 |
| 2,601,422 | 6/52 | Thumim | 200—146 X |
| 2,626,328 | 1/53 | Lessard | 200—51 |
| 2,749,410 | 6/56 | Weston | 200—144 |
| 2,769,062 | 10/56 | Kees | 200—144 |
| 2,914,627 | 11/59 | Eichelberger | 200—51 |
| 2,933,574 | 4/60 | Frink | 200—144 |
| 2,967,220 | 1/61 | Finley | 200—144 |
| 2,967,919 | 1/61 | Greaves | 200—106 |
| 3,025,376 | 3/62 | Yarrick | 200—144 |
| 3,047,694 | 7/62 | Sullivan | 200—106 |
| 3,054,876 | 9/62 | Wood | 200—144 X |

FOREIGN PATENTS

| | | |
|---|---|---|
| 778,456 | 7/57 | Great Britain. |
| 277,338 | 9/30 | Italy. |

BERNARD A. GILHEANY, *Primary Examiner.*